United States Patent
Richter

(10) Patent No.: US 6,899,256 B2
(45) Date of Patent: May 31, 2005

(54) BAG STABILIZER

(76) Inventor: William R. Richter, 4463 Abinadi Rd., Salt Lake City, UT (US) 84124

(*) Notice: Subject to any disclaimer, the term of this patent is extended or adjusted under 35 U.S.C. 154(b) by 75 days.

(21) Appl. No.: 10/335,306

(22) Filed: Dec. 30, 2002

(65) Prior Publication Data

US 2004/0124222 A1 Jul. 1, 2004

(51) Int. Cl.$^7$ ................................................. B60R 7/00
(52) U.S. Cl. ............................ 224/311; 24/298; 24/302; 211/119.1; 224/313; 224/314; 224/547; 224/549; 224/925; 248/95
(58) Field of Search ................................ 224/311, 313, 224/314, 318, 539, 543, 547, 549, 551, 925, 927; 280/727; 211/119.1; 248/95, 353; 24/265 R, 265 H, 298–302, 370, DIG. 29

(56) References Cited

U.S. PATENT DOCUMENTS

| | | | | |
|---|---|---|---|---|
| 1,503,298 A | * | 7/1924 | Campbell | 224/311 |
| 1,831,717 A | * | 11/1931 | Muniente | 211/119.1 |
| 1,979,627 A | * | 11/1934 | Kozak | 211/119.1 |
| 2,629,528 A | * | 2/1953 | Vealey | 224/313 |
| 2,645,390 A | * | 7/1953 | Colman | 224/551 |
| 2,742,253 A | * | 4/1956 | July | 248/353 |
| 2,849,772 A | * | 9/1958 | Bukowski | 24/136 R |
| 3,193,212 A | * | 7/1965 | Lotta | 211/119.1 |
| 5,147,078 A | * | 9/1992 | Flieder | 224/549 |
| 5,234,245 A | * | 8/1993 | Peterson et al. | 294/158 |
| 5,340,004 A | * | 8/1994 | Moore | 224/563 |
| 5,357,656 A | * | 10/1994 | Trowbridge | 24/370 |
| 5,427,288 A | * | 6/1995 | Trubee | 224/539 |
| 5,685,470 A | * | 11/1997 | Moore | 524/547 |
| 5,685,592 A | * | 11/1997 | Heinz | 224/925 |
| 6,062,452 A | * | 5/2000 | Kauskey | 224/539 |
| 6,371,342 B2 | * | 4/2002 | Larsen | 224/311 |
| 6,502,731 B1 | * | 1/2003 | Gehring et al. | 224/925 |
| 6,702,317 B2 | * | 3/2004 | Wang | 280/727 |
| 2002/0077020 A1 | * | 6/2002 | Graf et al. | 446/227 |

* cited by examiner

Primary Examiner—Gary E. Elkins
(74) Attorney, Agent, or Firm—William R. Richter

(57) ABSTRACT

A system for stabilizing articles is provided. The system is particularly well-suited for stabilizing plastic grocery bags during transport in a vehicle. The system comprises a stabilizing element that, when in use, extends from a first point to a second point and passes through the handles of a bag to be stabilized. Preferably, the first and second points are fixed, either detachably or semi-permanently, on the sidewalls in the interior of a vehicle. Further, the stabilizing element preferably is flexible. In addition, the stabilizing element preferably can be disconnected from the second point and also preferably, the stabilizing element can recoil into a location at the first point so that only a portion of the stabilizing element is visible. Other preferred embodiments of the present invention, including those with intermediary fixtures or intermediary support features, as well as those with multiple stabilizing elements, also are disclosed. In addition to stabilization during travel, the stabilizing system provides a certain degree of freedom in allowing a bag to move with the inertial forces imposed on it during travel. Also, the stabilizing system provides a convenient, easy and simple method for loading bags into and unloading bags from a vehicle, thereby requiring very little time and effort to utilize.

23 Claims, 4 Drawing Sheets

BAG STABILIZER

This invention relates generally to the stabilization of bags, luggage and the like during transport.

BACKGROUND OF THE INVENTION

During transport, e.g., in an automobile, anything contained in the automobile tends to be disturbed or jostled. This disturbance to the stability (or jostling) of the automobile's contents becomes more apparent when the automobile travels over bumps or around turns. With the example of automobiles, this disturbance is greater with sport utility vehicles ("SUVs"), as compared to sedans, because SUVs have a higher center of gravity and correspondingly, have interiors that are higher off the ground.

Fortunately, most vehicles are equipped with seatbelts and specially-designed seats to limit the amount of jostling on the vehicle's human occupants. Unfortunately, however, little attention has been paid to making the ride more stable for the inanimate contents of a vehicle, such as luggage or bags.

Some bags are prone to stability when transported. Traditional luggage, like a suitcase for example, has a clearly-defined base, or surface, designed to stay in contact with the floor, including the relatively flat, or horizontal, surfaces of a vehicle. In addition, traditional luggage typically has clearly-defined sidewalls, thereby, together with a base, provide some degree of support structure. Consequently, these traditional pieces of luggage, particularly when packed so as to have a relatively low center of gravity and well-distributed contents, are rarely jostled, and thus, its contents are disturbed to a relatively minor extent during transport.

Other bags are prone to instability when transported. For example, contemporary plastic grocery bags are prone to instability. By comparison to traditional luggage, plastic grocery bags have no clearly-defined base and no clearly-defined sidewalls. Accordingly, plastic grocery bags provide very little support structure to its contents. Consequently, regardless of the manner in which they are packed, unless its contents are inherently stable, plastic grocery bags are disturbed to a large extent during transport.

Thus, keeping to our example of automobiles, plastic grocery bags, and their contents, will be jostled around during transport in the trunk of a sedan, and will be jostled around to a greater extent in the rear (or cargo area) of an SUV. A plastic grocery bag, and its contents, will simply be moved by the inertial forces imposed upon it during travel and will roam about the area in which it is confined. Thus, upon arrival at an intended destination, a person will be confronted with plastic grocery bags and their contents in disarray. Even if by chance, the contents manage to remain largely in the plastic bags, the person will still have difficulty trying to find the handles of each bag so that they can be lifted out of the vehicle. Typically, such problems are propounded with an increase in the number of plastic bags being transported.

In the automobile industry, several methods of addressing the problems inherent in transporting plastic grocery bags have been introduced. One such method has been to provide grocery bag hooks in a vehicle. These hooks are situated on an inside wall, or relatively vertical surface of the vehicle, and at a location above the relatively horizontal surface upon which a plastic bag is intended to "rest." Typically, a hook is a permanently fixture in an automobile and designed to allow a user to place the handles of a plastic bag around it, thereby stabilizing the handles of the bags in hopes of stabilizing the bag and its contents.

There are several drawbacks, however, to grocery bag hooks. First, it often is difficult to place a bag on a hook, as well as removing it from a hook. This is due, in part, because the hooks are against a sidewall, which may serve as an obstacle, and because they are against a sidewall, one has to reach a certain distance into the vehicle to use the hook. Second, it often is difficult to grasp the handles of a bag from a hook because the handles often are "stretched" (or rather elongated) because the hook is not flexible. When the handles of a bag are stretched, or elongated, or twisted, the openings of the handles become difficult to discern, both with one's eyes and with one's hands. Third, a relatively limited number of bags can be placed on each hook. If the bags are roughly the same size, there only is a limited amount of "floor" space available for bags intended for a given hook because each bag's handles must be placed on the hook. Fourth, if there are a large number of bags, many hooks will be needed. In this regard, when more hooks are needed, the additional hooks become more difficult to reach. Fifth, it is possible for a bag to become separated from a hook, as there is nothing to maintain the handles of a bag in place on a hook. Consequently, loading bags on hooks and removing bags from hooks, as well as from the vehicle, is quite cumbersome and can be rather difficult.

Another method for addressing the problems inherent in transporting grocery bags is a net-type device, sometimes referred to as a "cargo net." Typically, such nets extend between two points in an automobile. For example, in an SUV, a net may extend between the two sidewalls of the rear section, or cargo area, of the vehicle. Generally, the net itself may have two sidewalls, connected at the bottom, and an open top for receiving cargo, i.e., various items, including plastic grocery bags. Thus, such a net has a generally V-shaped or generally U-shaped cross-section. Also, the sidewalls of a net may be flexible to accommodate bags or items of various sizes.

There are several drawbacks, however, to cargo nets. First, as opposed to the hooks that typically are permanently-fixed features of an automobile, nets need to be set-up and taken-down. Otherwise, a net would use too much valuable cargo space when a net was not necessary, e.g., transporting pieces of furniture. Accordingly, using a net takes time, and typically needs to be stowed for extended periods of time. Second, the net is inherently cumbersome to use in that it is prone to tangling, i.e., unless it is always set-up in its ready-to-use mode. Third, a net has limited flexibility and accordingly, has a somewhat limited capacity. Fourth, with a net, the handles of a plastic grocery bag are not confined to a designated location during transport. Consequently, finding the handles of each plastic bag often is not easily accomplished. Thus, in light of these many disadvantages, a net designed to hold grocery bags, is underutilized.

Yet another method for addressing the problems inherent in transporting grocery bags is to provide containment areas. Typically, these containment areas are areas smaller than the trunk of a sedan or the cargo area of an SUV and devoted to holding a small number, sometimes even a single, grocery bag. Typically, a containment area is a prominently-visible compartment that is sometimes a compartment recessed into the floor surface or sidewall of a vehicle. In some vehicles, however, such as SUVs or station wagons, the floor surface of the rear section will lift up and reveal a containment area devoted to holding bags. Such a hidden containment area may have one or more compartments designed for this purpose. In this way, the compartments provide a certain amount of sidewall to support individual (or maybe a couple of) bags. Further, a containment area may be equipped with flexible cords or other devices or features to help provide additional support.

There are several drawbacks, however, to containment areas. First, containment areas provide limited stability to the bags or articles they are designed to stabilize. Even if additional support features are provided, use of these features makes containment areas more difficult to use, i.e., by requiring several steps to stabilize an item. Second, there is a limited amount of space provided to stabilize items in a containment area, and usually more limited in a hidden containment area. This drawback is common to most areas specially designed to stabilize items. Third, containment areas usually have very little flexibility, e.g., to accommodate items of varying and/or odd size and/or shape. Fourth, containment areas are often difficult to use. For example, as just described, items may not quite fit easily in a containment area. Also, hidden containment areas may be more difficult to use than visible containment areas. For example, lifting up a section of the floor surface of the cargo area of an SUV requires that section of floor surface to be free of items or requires one to relocate whatever may be on top of that surface before accessing the hidden compartment area. Thus, in light of their many disadvantages, containment areas are underutilized.

Another device that provides containment areas for addressing the problems inherent in transporting grocery bags is that of an organizer. As with a net, an organizer would need to be set-up and taken-down so that the entire cargo area can be put to other uses. An organizer usually is a structure that is separate from the vehicle, but can be placed in a vehicle to provide a number of smaller containment areas to hold individual (or maybe a couple of) items. As with a hidden compartment (or even a prominently-visible and/or recessed compartment), such areas provide a degree of sidewall support that otherwise would not exist.

There are several drawbacks, however, to organizers for automobiles. First, such organizers require a relatively large amount of space when in use and when not in use. Most users do not welcome the idea of devoting a large amount of space in their automobile to such devices. Second, assembly, or set-up, of such organizers is not easy and requires time. These first two drawbacks alone render an organizer an impracticable device for addressing the concerns raised herein. Third, when placing a bag in or taking a bag out of a compartment that is located too far into the interior of an automobile, it is difficult for one to reach such compartments. Fourth, as stated above, any defined compartment provides limited flexibility for accommodating odd-sized items. Thus, as with a net and a hidden compartment area, in light of its many disadvantages, organizers are left underutilized.

From the conventional methods just described and their drawbacks, it is evident that there is a certain cost-benefit analysis applicable to the problems inherent in transporting grocery bags or similar articles. There must be an expected and definite benefit from a method that requires a user to invest any extra time and energy in transporting grocery bags. If the benefit is limited, then the user usually will forego the use of the device. Even if the potential benefit is great, however, a user may forego using a device if such device requires too much effort and time to utilize. Typically, a user is in a parking lot with a shopping cart full of plastic grocery bags and wants to be able to load them from the cart into an automobile in a quick and easy fashion. Often, such user will forego any stability concerns, take their chances, and hope that it doesn't result in broken bottles and cracked eggs. Even if their hopes are met, however, a user will inevitably find a jumble of bags and groceries scattered in the location in which the bags were left.

It is, therefore, desirable to provide a system for stabilizing bags, particularly grocery bags, which is simple, easy to use and saves time. Additionally, it is desirable for such system to require very little space-both when in use and when not in use, yet accommodate a large number of bags, and be flexible to accommodate bags of various sizes. Such system must provide a significant benefit at very little cost-in time and effort-to the user.

SUMMARY OF THE INVENTION

A system for stabilizing articles is provided. The system comprises a stabilizing element that, when in use, extends from a first point to a second point and passes through at least one article to be stabilized. The stabilizing system is particularly suited for stabilizing bags having handles during transport in a vehicle. In addition, the system is particularly suited for stabilizing plastic grocery bags during transport in an automobile.

In preferred embodiments, when in use, the first and second points of the stabilizing element are fixed, either detachably or semi-permanently, on the sidewalls of a vehicle. Preferably, the stabilizing element is flexible, and more preferably, is made primarily of bungee cord. Preferably, the stabilizing element can be disconnected from the second point and also preferably, when not in use, the stabilizing element can recoil into a location at the first point so that only a portion of the stabilizing element is visible.

In certain preferred embodiments, the stabilizing system of may further comprise an intermediary support feature for additional support of the stabilizing element. Such an intermediary support feature is situated between the first point and the second point so that the stabilizing element passes through or over the intermediary support feature.

A preferred embodiment of the stabilizing system of the present invention for stabilizing articles in a vehicle comprises a first stabilizing element that can pass through at least one article to be stabilized and a second stabilizing element that can pass through at least one article to be stabilized. In such embodiment, each stabilizing element has a proximal end and a distal end, wherein each proximal end is fixed, either detachably or semi-permanently, on a sidewall in the interior of the vehicle, and wherein the distal end of the first stabilizing element can interlock with the distal end of the second stabilizing element. In certain preferred embodiments, each distal end comprises a hook for interlocking the two stabilizing elements together. In other preferred embodiments, at least one of the stabilizing elements can recoil into the location where its proximal end is fixed into the sidewall so that only a portion of such stabilizing element is visible.

A method of stabilizing at least one bag having handles also is provided. The method comprises the following steps: providing a stabilizing system having a single stabilizing element in accordance with the present invention; and when the stabilizing element is connected only to a first point, gripping the bag by its handles; placing the stabilizing element through the handles of the bag; and connecting the stabilizing element to a second point.

DETAILED DESCRIPTION OF THE PREFERRED EMBODIMENT

The present invention provides a system for stabilizing bags, particularly grocery bags, which is simple, easy to use and saves time. Additionally, such system requires very little space both when in use and when not in use, accommodates a large number of bags, and is flexible to accommodate bags of various sizes. This bag stabilizing system of the present invention provides a significant benefit at very little cost—in time and effort—to the user.

Although the following description illustrates the present invention in the cargo area of an SUV, the bag stabilizing system of the present invention can be used in any automobile, other areas of an automobile (such as a trunk or rear seat area), and in other vehicles (such as airplanes and trains). Additionally, although the following description illustrates the present invention in cooperation with plastic grocery bags, the stabilizing system can be used to stabilize many types of articles through which a stabilizing element can pass, including other bags having handles, e.g., paper and plastic shopping bags having handles, handbags, and various pieces of luggage having handles.

Figure 1:
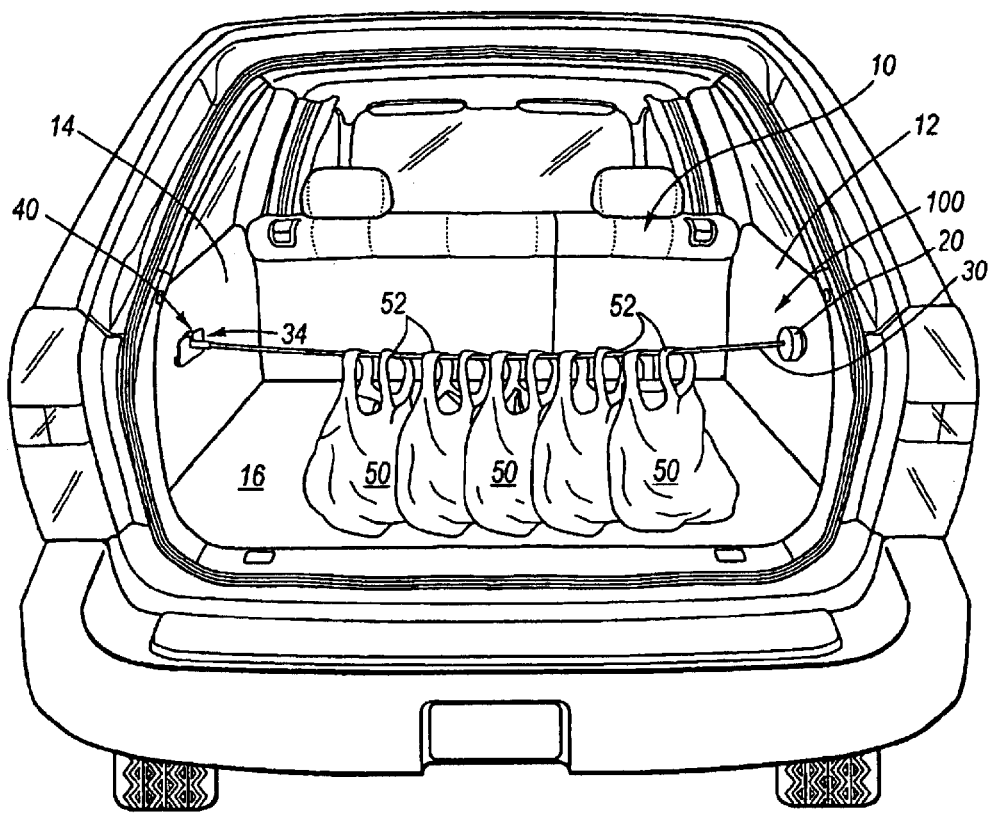
FIG. 1 is an isometric view of a preferred embodiment of a stabilizing system according to the present invention.

FIG. 1 shows an isometric view of a preferred embodiment of a stabilizing system according to the present invention. In particular, from the perspective of one looking into the rear of an SUV, FIG. 1 shows a stabilizing system 100 in cooperation with the cargo area 10 of an SUV with its rear hatch-door (not shown) open.

As shown in FIG. 1, the stabilizing system 100 of the present invention comprises a base 20 affixed to a first sidewall 12 of the cargo area 10, a stabilizing element 30, and an anchor 40 affixed to a second sidewall 14 of the cargo area 10. Note that although not preferred, a sidewall may include the interior surface of a window. When in use, the stabilizing element 30 extends between a first point (the base 20 in FIG. 1) and a second point (the anchor 40 in FIG. 1). Preferably, both the first point 20 and the second point 40 are fixed (either detachably or semi-permanently) with respect to the vehicle. Additionally, when in use, the stabilizing element 30 extends through the handles 52 of any bag 50 (or other article) needed to be stabilized.

The stabilizing element 30 needs only pass through an article 50 to which it is intended to stabilize, and stabilize such article 50. Accordingly, the stabilizing element 30 may be any length of material, e.g., rope, line, wire, cord or rod. In addition, a stabilizing element 30 may be almost any material, e.g., cotton, nylon or other plastic, or a combination of materials. Certain properties, however, are desired for a stabilizing element 30. For example, the stabilizing element 30 should be sufficiently strong, i.e., in taughtness or rigidity, to stabilize articles 50 during transport.

Preferably, the stabilizing element 30 is flexible, more preferably is made of flexible cord, such as bungee cord, and when extended, is sufficiently taught to stabilize articles during transport. One factor that may affect the desired taughtness of a stabilizing element 30, however, is its height above the surface 16 on which the bags 50 are to "rest." A stabilizing element 30 should not be situated and/or have a certain taughtness or inflexibility to prevent bags 50 from "resting" on the floor surface 16, i.e., the bags 50 should not tend to "lift" or rise off the floor surface 16. Further, a flexible stabilizing element 30 should be sufficiently taught to stabilize the bags 50 (or other articles), while at the same time, providing a degree of freedom, allowing bags 50 to move and adjust to imposed inertial forces.

In a preferred embodiment, the stabilizing element 30 recoils into the base 20 (by any means known in the art, e.g., a mechanical spring) when not in use, making only the distal end 34 of the stabilizing element 30 visible. In this embodiment, when needed, the stabilizing element 30 can be pulled out of the base 20 and its distal end 34 can be passed through the handles 52 of bags 50 and attached to the anchor 40. This attachment is accomplished by interlocking the distal end 34 of the stabilizing element 30 with a receiving feature 42 on the anchor 40, as shown in greater detail in FIG. 2.

Figure 2:
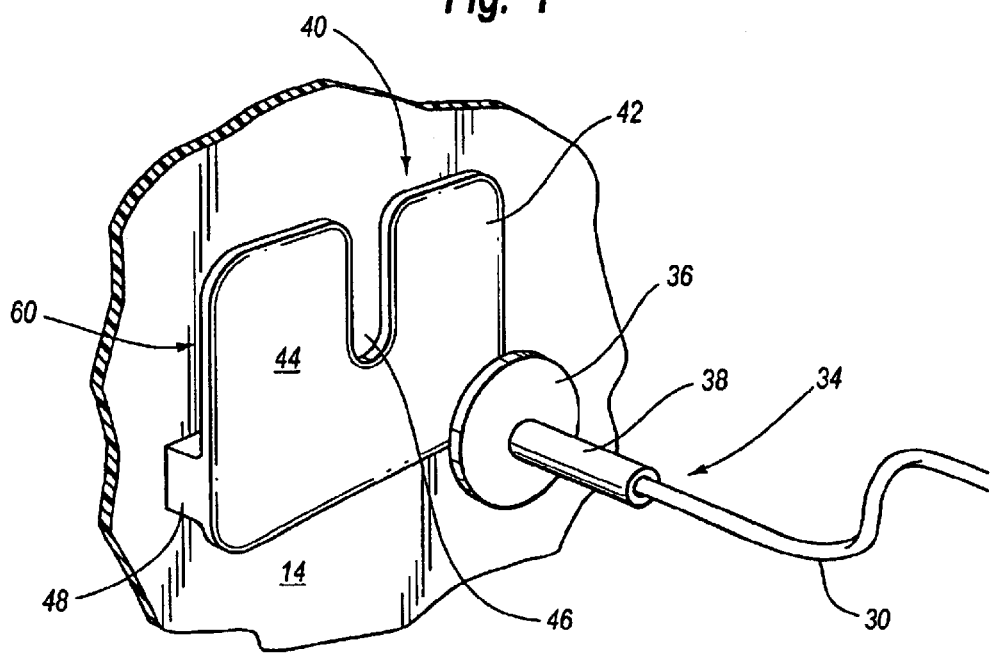
FIG. 2 is a cut-away view of a mechanism of how the distal end of a stabilizing element of FIG. 1 interlocks with a receiving feature on the anchor of FIG. 1.

FIG. 2 depicts a cut-away view of a mechanism of how the distal end 34 of the stabilizing element 30 can interlock with a receiving feature 42 on the anchor 40. Preferably, this mechanism is very simple. For example, in a preferred embodiment, the distal end 34 of the stabilizing element 30 comprises a plastic disk 36 substantially-perpendicularly affixed (with respect to the longitudinal axis of the stabilizing element 30 when in use) to the stabilizing element 30 by way of a short plastic rod 38. The disk 36 is simply placed above and beyond a face 44 of the receiving feature 42, as the rod 38 is slid into a channel 46 in the receiving feature 42.

Figure 3:
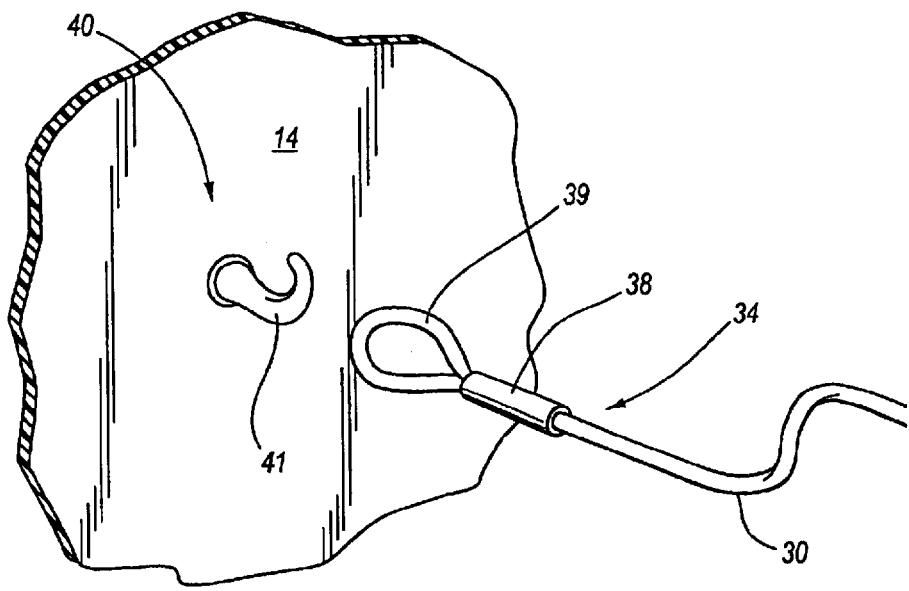
FIG. 3 is a cut-away view of a mechanism of an alternative mechanism of how the distal end of a stabilizing element of FIG. 1 interlocks with an anchor of the present invention.

The receiving feature 42 is connected to the second sidewall 14 of the cargo area 10 by means of a spacer member 48, thereby providing a space 60 for the disk 36 to be placed between the face 44 of the receiving feature 42 and the sidewall 14. To undo the connection of the disk 36 and the anchor 40, one simply grabs the rod 38 on the stabilizing element 30 and reverses the course of the disk 36 out of receiving feature 44 of the anchor 40. The mechanism illustrated by way of FIG. 2 is one preferred embodiment. Accordingly, there are numerous alternative configurations in which the distal end 34 of the stabilizing element 30 can interlock with the anchor 40 while still keeping within the principles and spirit of the invention. For example, as shown in a cut-away of FIG. 3, instead of a disk 36, the stabilizing element 30 may have a loop 39 connected to the rod 38. In addition, the anchor 40 may comprise a hook 41 to which the loop 39 can attach. To undo the connection, one simply removes the loop 39 from the hook 41.

Another preferred embodiment of the stabilizing system 100 of the present invention does not provide for recoiling of the stabilizing element 30 into the base 20. The stabilizing element 30 may be permanently affixed to the base 20 or may be detachable so that it may be hidden when the system 100 is not in use. Alternatively, if the stabilizing element 30 is permanently affixed to the base, the majority of the length of the stabilizing element 30 (including the distal end 34) may be placed in a compartment located in the sidewall 12 of the cargo area 10 or simply rest adjacent the sidewall 12. In this particular embodiment, the stabilizing element 30 will not unintentionally recoil into the base 20, although the stabilizing element 30 will not automatically be hidden when not in use.

Figure 4:
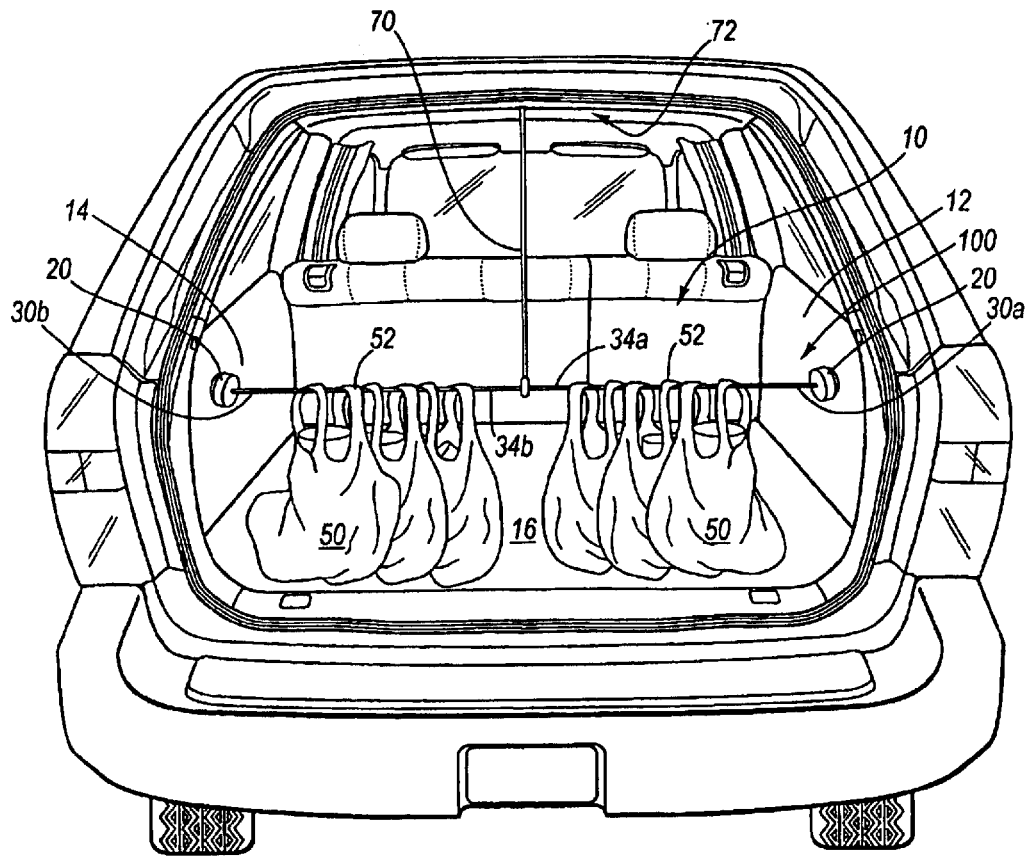
FIG. 4 is an isometric view of an alternative embodiment of the stabilizing system of the present invention having two stabilizing elements.

FIG. 4 shows an alternative embodiment of the stabilizing system 100 of the present invention. In the embodiment of FIG. 4, the stabilizing system 100 comprises a first stabilizing element 30a and a second stabilizing element 30b. The first stabilizing element 30a extends from a first sidewall 12 to an intermediary fixture 70, while the second stabilizing element 30b extends from a second sidewall 14 to the intermediary fixture 70. Each stabilizing element 30a and 30b may extend from a base 20 attached to each respective sidewall 12 and 14. As shown, the fixture 70 extends down from the roof 72 of the cargo area 10, to a location where the distal ends 34a and 34b of each stabilizing element 30a and 30b can attach to the fixture 70. The intermediary feature 70 may be fixed with respect to the vehicle, but also, may be flexible. Preferably, when not in use, the fixture 70 remains temporarily fixed in the roof 72 by any means known in the art. The mechanism for attaching each stabilizing element 30a and 30b to the fixture 70, as well as un-attaching the same, preferably is very simple and easy to accomplish. For example, such mechanism can be the same as or similar to that disclosed in either FIG. 2 or FIG. 3.

As shown in FIG. 4, there may be several point-to-point stabilizing systems 100 in a single vehicle, wherein each system 100 has a stabilizing element 30. Similarly, as illustrated in FIG. 4, while the stabilizing element 30 as disclosed in FIG. 1 is one segment extending from a first sidewall 12 to a second sidewall 14, such arrangement is not required.

Figure 5:
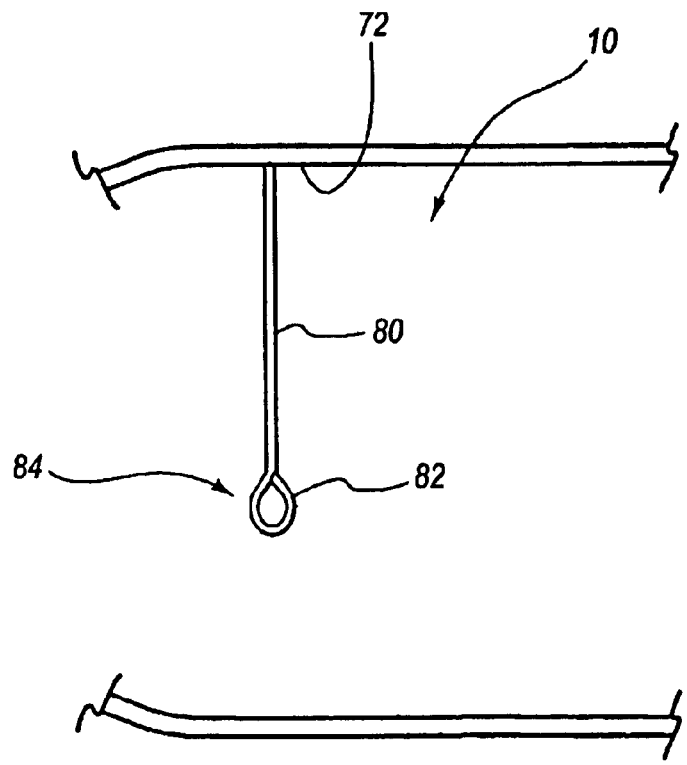
FIG. 5 is a cut-away side view of an intermediary support feature of the present invention in the cargo area of an SUV.
Figure 6:
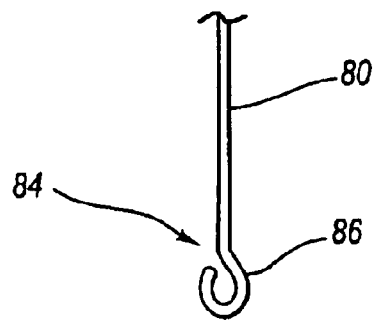
FIG. 6 is a cut-away side view of a hook on the distal end of an intermediary support of the present invention.

An intermediary feature 70 need not extend down from the roof of an SUV. For example, such feature 70 may extend up from the floor of an SUV or the trunk of a sedan or be situated in any number of ways. Alternatively, other embodiments of the present invention may include one or more intermediary support features 80 (being situated similarly to feature 70 in FIG. 4) to help support a single stabilizing element 30. FIG. 5 shows a cut-away side view of an intermediary support feature 80 in the cargo area 10 of an SUV. As shown, intermediary support feature 80 may extend down from the roof 72 of an SUV and comprises a ring 82 at its distal end 84 through which the stabilizing element 30 passes. Alternatively, feature 80 can comprise a hook 86 over which the stabilizing element 30 passes. FIG. 6 shows a cut-away side view of such a hook 86 on the distal end 84 of such intermediary support feature 80. In such embodiments, the intermediary feature or features 80 also would compartmentalize the area over which the stabilizing element 30 extends.

Figure 7:
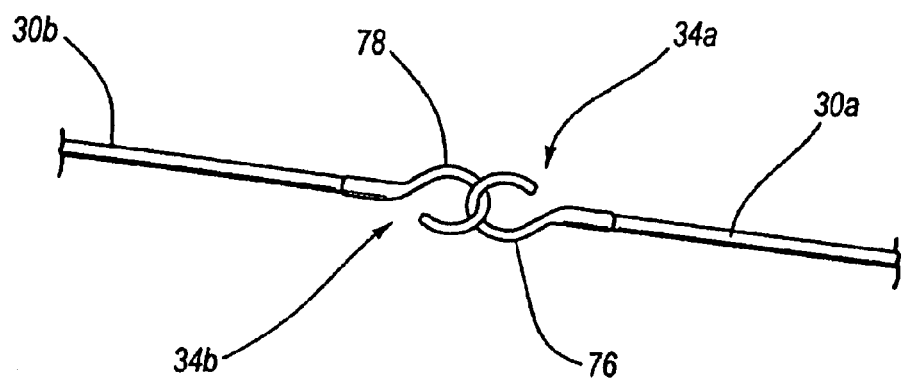
FIG. 7 is a cut-away view of the mechanism of how a first stabilizing element may connect directly to a second stabilizing element in accordance with the present invention.

In one alternative embodiment, a stabilizing system 100 of the present invention may be similar to that shown in FIG. 4, but may not include an intermediary fixture 70. For example, stabilizing element 30a may connect directly to the other stabilizing element 30b, as shown in FIG. 7, a cut-away view of this mechanism. Thus, in this embodiment, an intermediary fixture 70 is not needed. As shown in FIG. 7, each stabilizing element 30a and 30b has a respective hook 76 and 78 (preferably plastic) around their respective distal ends 34a and 34b so that the two stabilizing elements 30a and 30b can temporarily interlock. A user merely places the handles 52 of the bags 50 around a stabilizing element 30a (and if needed, additional bags 50 around the second stabilizing element 30b) and then interlocks the two hooks 76 and 78. Upon arrival at the intended destination, the user then separates the hooks 76 and 78 to remove the bags 50 from the stabilizing elements 30a and 30b.

Figure 8:
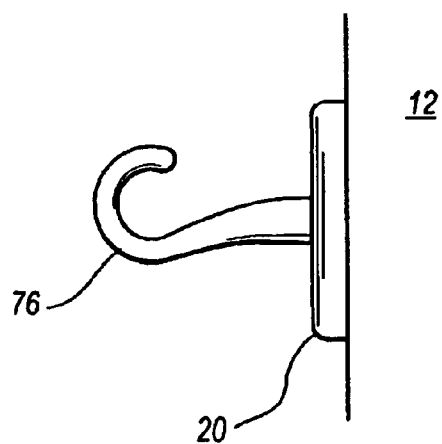
FIG. 8 is a cut-away view of a hook on the distal end of a stabilizing element when such stabilizing element has been recoiled in its base.

With the embodiment of FIG. 7, the stabilizing elements 30a and 30b may interlock in another simple and easy manner. In addition, the stabilizing elements 30a and 30b may extend from bases 20, as shown in FIG. 4, or merely be fixed, either detachably or semi-permanently, in their respective sidewalls 12 and 14. If bases 20 are used, the stabilizing elements 30a and 30b may recoil back into the bases 20 when not in use, thereby making only the hooks 76 and 78 visible, as shown in a cut-away view of FIG. 8.

As demonstrated in FIG. 7, a single stabilizing system 100 may have more than one stabilizing element. In the embodiment of FIG. 7, such stabilizing system 100 has two stabilizing elements 30a and 30b.

In another alternative embodiment of the present invention in cooperation with an automobile, a stabilizing system 100 is located in the rear seat area of the automobile. In such an embodiment, the stabilizing element 30 may extend from a sidewall in this area (or rear side door) to the other sidewall (or rear side door), passing through the handles 52 of bags 50. The bags 50 may "rest" on the rear seat or may "rest" on the floor surface of the rear seat area. Alternatively, the stabilizing element 30 may extend from a first sidewall (or rear side door) to an intermediary feature 70 that extends down from the roof 72 of the vehicle. Such an arrangement would be the same as that disclosed in FIG. 4, but would be located in the rear seat area of an automobile. Alternatively, the stabilizing element 30 may extend from a first sidewall (or rear side door) to an anchor 40 at some other location.

With the stabilizing system 100 of the present invention, several factors may affect the system's performance in stabilizing bags 50 or other articles. A greater level of friction of the outer surface of the stabilizing element 30 may help stabilize bags 50, but too great a level of friction may hinder placing bags 50 on or removing bags 50 from the stabilizing element 30. Thus, a level of friction of the outer surface of the stabilizing element 30 is preferably great enough to assist in stabilizing the bags 50, but not great enough to hinder placing bags 50 on or removing bags 50 from the stabilizing element 30.

Another factor that may affect the stabilizing system's performance in stabilizing bags 50 or other articles is the level of friction of the floor surface 16 on which the bags 50 or other articles 50 "rest," are placed. A greater level of friction of the floor surface 16 may help stabilize bags 50, but too great a level of friction may limit the use of the floor surface 16 for other purposes. A plastic or rubberized floor mat, which is common in the cargo area of SUVs, serves as a preferred floor surface covering for use with the present invention. Such a covering is particularly convenient for use with the present invention because a user often desires such covering to be in place even when the stabilizing system 100 is not in use.

The stabilizing system 100 of the present invention occupies relatively little space in one's automobile. A particular advantage of the stabilizing system 100 is that it makes use of the handles 52 of the bags 50 it is designed to stabilize. One simply grips the handles 52 of each bag 50 with one hand and passes the stabilizing element 30 through with the other hand.

The ability to place the system 100 near the exterior of the automobile makes it easy to operate and easy to load and unload bags 50. Additionally, a stabilizing system 100 of the present invention has the ability to provide a significant amount of floor space 16 on which the bags 50 can rest, thereby providing ample room to accommodate many bags 50. Further, with the stabilizing element 30 completely passing through each bag's set of handles to a closed point, there is no chance of a bag 50 falling off or separating from the system 100 under normal conditions. In this way, there also is little chance of a bag 50 losing any of its contents; each bag's handles 52 are maintained at a height above most of a bag's contents, similar to that of a person holding a bag 50 by its handles 52. Thus, the bags 50 and their contents remain stable during transport. As with placing the bags 50 in the system 100, their removal is just as easy, as the handles 52 of the bags 50 are kept together during transport and therefore, easy to locate and grasp upon arrival at one's destination.

Additional benefits of the present invention are enhanced with embodiments where the stabilizing element 30 is flexible (such as a bungee cord). A flexible stabilizing element 30 provides greater flexibility to the stabilizing system 100. A flexible stabilizing element 30 allows for the system 100 to accommodate bags 50 of varying sizes to a greater degree. Also, in accordance with the principles of the present invention, the stabilizing element 30 provides a certain degree of freedom in allowing a bag 50 to move with the inertial forces imposed on it during travel. When the stabilizing element 30 is flexible, this benefit is enhanced. In this way, the system 100 will allow a bag to move with inertial forces, but typically not enough to cause significant disturbance to a bag's contents. Additionally, while a bag 50 may move slightly during transport, the handles 52 of such bag will remain in place around the stabilizing element 30, preventing any loss of contents of the bag 50 and allowing for easy removal of the bag 50.

Note that with the present invention, flexibility may be provided to the system 100 by some means other than, or in addition to, the stabilizing element 30. For example, flexibility may be provided to the system 100 through a base 20 or through some other form of connection of the stabilizing element 30 to the sidewall or other connection point (such as an anchor 40 or intermediary fixture 70). Also, such flexibility may be provided through a recoil mechanism in a base 20. In this alternative way of providing flexibility, the same benefits derived from a flexible stabilizing element 30 can be achieved.

It is to be understood that even though numerous characteristics and advantages of the present invention have been set forth in the foregoing description, together with details of the structure and function of the invention, the disclosure is illustrative only. Accordingly, changes may be made in detail, especially in matters of shape, size and arrangement of parts within the principles of the invention to the full extent indicated by the broad general meaning of the terms in which the appended claims are expressed.

What is claimed is:

1. A method of stabilizing a bag, the bag having handles, the method comprising:
   providing a stabilizing system, the system comprising:
      a stabilizing element connected to a first point and configured to extend to a second point when the stabilizing system is in use,
   placing the stabilizing element through the handles of the bag, and
   connecting the stabilizing element to the second point.

2. The method of claim 1 for stabilizing the bag in a vehicle, wherein the stabilizing element is a cord.

3. A method of stabilizing one or more bags, each bag having at least one handle, the method comprising:
   providing a stabilizing system, the system comprising;
      a stabilizing element connected to a first point and configured to extend to a second point when the stabilizing system is in use,
   placing the stabilizing element through the at least one handle of each bag, and
   connecting the stabilizing element to the second point.

4. The method of claim 3 for stabilizing the one or more bags in a vehicle, wherein the stabilizing element is a cord.

5. A vehicle having a stabilizing system, the stabilizing system comprising:
   a stabilizing element comprising a cord, the stabilizing element extending from a first point to a second point and passing through at least one handle of a bag, the stabilizing element stabilizing the bag.

6. The vehicle of claim 5, wherein the stabilizing element is retractable.

7. The vehicle of claim 5, wherein the vehicle has a roof surface and a floor surface and the stabilizing element is situated such that it is more proximate the floor surface than the roof surface.

8. The vehicle of claim 5, wherein the vehicle has a rear cargo area and the stabilizing element is situated in the rear cargo area.

9. The vehicle of claim 5, wherein the vehicle has windows and the stabilizing element is situated below the windows.

10. The vehicle of claim 5, wherein the bag makes contact with a floor surface.

11. The vehicle of claim 5, wherein the stabilizing element passes through handles of a plastic grocery bag.

12. The vehicle of claim 8, wherein the cargo area comprises a trunk.

13. The vehicle of claim 5, wherein the vehicle comprises a base, the base serving as the first point from which the stabilizing element extends.

14. The vehicle of claim 13, wherein the vehicle further comprises an anchor, the anchor serving as the second point to which the stabilizing element extends.

15. The vehicle of claim 5, wherein the bag cannot readily be removed from the vehicle without disengaging the stabilizing element from the second point.

16. The vehicle of claim 5, wherein the bag makes contact with a seat.

17. The vehicle of claim 5, wherein the vehicle has a floor surface, the floor surface having a recessed containment area, the containment area having a floor surface, wherein the bag makes contact with the floor surface of the containment area.

18. The vehicle of claim 5, wherein the stabilizing element extends from only two points, the two points being the first point and the second point.

19. The vehicle of claim 5, wherein the stabilizing element extends generally horizontally from the first point to the second point.

20. A vehicle having a rear cargo area, the vehicle comprising a stabilizing system situated in the rear cargo area, the stabilizing system comprising:
   a first stabilizing element comprising a first cord having a proximal end and a distal end; and
   a second stabilizing element comprising a second cord having a proximal end and a distal end;
   wherein the distal end of the first stabilizing element is configured to interlock with the distal end of the second stabilizing element such that the stabilizing system spans a distance from the proximal end of the first stabilizing element to the proximal end of the second stabilizing element such that when the distal end of the first stabilizing element is interlocked with the distal end of the second stabilizing element and the stabilizing system passes through at least one bag, the stabilizing system stabilizes the at least one bag and the at least one bag makes contact with at least a floor surface such that the floor surface helps to stabilize the at least one bag; and wherein the stabilizing system passes through at least one handle of the at least one bag, the stabilizing system stabilizing the at least one bag.

21. A vehicle having a rear cargo area, the vehicle having an interior and comprising a stabilizing system, the stabilizing system situated in the interior of the vehicle and the stabilizing system comprising:

a stabilizing element comprising a cord situated in the rear cargo area, the cargo area having a roof surface and a floor surface, the stabilizing element configured to extend generally horizontally only between a first point and a second point such that when the stabilizing element extends from the first point to the second point and passes through at least one article, the stabilizing element stabilizes the at least one article and the at least one article makes contact with at least the floor surface such that the floor surface helps to stabilize the at least one article;

wherein the stabilizing element is situated such that it is more proximate the floor surface than the roof surface; and wherein the stabilizing element has sufficient flexibility so that the stabilizing system provides, a degree of freedom in allowing the at least one article to shift with inertial forces imposed on it when the vehicle is in motion.

22. A vehicle having a rear cargo area, the vehicle having an interior and comprising a stabilizing system, the stabilizing system situated in the interior of the vehicle and the stabilizing system comprising:

a stabilizing element comprising a cord situated in the rear cargo area, the stabilizing element configured to extend generally horizontally only between a first point and a second point such that when the stabilizing element extends from the first point to the second point and passes through at least one article, the stabilizing element stabilizes the at least one article and the at least one article makes contact with at least a floor surface such that the floor surface helps to stabilize the at least one article;

wherein the cargo area has windows and the stabilizing element is situated below the windows in the cargo area; and wherein the stabilizing element has sufficient flexibility so that the stabilizing system provides a degree of freedom in allowing the at least one article to shift with inertial forces imposed on it when the vehicle is in motion.

23. A vehicle having a rear cargo area, the vehicle having an interior and comprising a stabilizing system, the stabilizing system situated in the interior of the vehicle and the stabilizing system comprising:

a stabilizing element comprising a cord situated in the rear cargo area, the stabilizing element configured to extend generally horizontally only between a first point and a second point such that when the stabilizing element extends from the first point to the second point and passes through at least one article, the stabilizing element stabilizes the at least one article and the at least one article makes contact with at least a floor surface such that the floor surface helps to stabilize the at least one article;

wherein the cargo area comprises a trunk;

and wherein the stabilizing element has sufficient flexibility so that the stabilizing system provides a degree of freedom in allowing the at least one article to shift with inertial forces imposed on it when the vehicle is in motion.

* * * * *